Patented Sept. 11, 1951

2,567,815

UNITED STATES PATENT OFFICE 2,567,815

PREPARED PASTRY FLOUR AND PROCESS OF PRODUCING THE SAME

Abraham Kipnis, Forest Hills, N. Y.

No Drawing. Application July 1, 1947, Serial No. 758,465

6 Claims. (Cl. 99—94)

The present invention has for an object to provide an improved prepared, pre-cooked pastry flour and a process for producing the same.

In the making of pastries of certain types, including French crullers, cream puffs and éclairs, and the like it is customary and necessary to cook a portion of the ingredients as a part of the preliminary preparation of the material for the final baking or frying. Usually the water and shortening, in the required amount, relatively and respectively, are boiled whilst flour, in required amount, is mixed therewith until a paste of required consistency is formed. Boiling is continued until the starch is gelatinized. This paste is then cooled to below cooking temperature whereupon other required ingredients, which do not need to be subjected to the preliminary cooking operation, are added to produce a batter or dough suitable for making certain pastries. Ordinarily, the material thus prepared must be baked or fried to produce the finished pastry within a short time in order to prevent deterioration or complete spoiling.

Such preliminary preparation of the material, including cooking and mixing operations, is laborious and time consuming. The present invention provides an improved procedure, including the necessary pre-cooking in part, whereby a substantially dry flour is produced in which the necessary ingredients are included such that the so prepared flour may simply be mixed with water or milk and baked or fried as desired.

The invention has been developed more particularly in the preparation of a French cruller and cream puff flour for home and bakery use and for convenience of disclosure of the principles of the invention such an embodiment of the invention will be more particularly described. It is to be understood, however, that the description of the selected embodiment is illustrative merely and is not intended as defining the limits of the invention.

According to one example of the invention a pastry flour may be prepared as follows: Mix 3 pounds of shortening such for example as cotton seed oil with 4 parts of water and heat to boiling. Add slowly during continued boiling and effective stirring about 6 pounds of flour, preferably wheat flour of good quality of the type used for pastry. The boiling or cooking should be equivalent to the preliminary cooking usual when preparing the batter or dough for making French crullers or cream puffs and the like in the usual way. When the required cooking is completed the starch is gelatinized. Such conversion of the starch is necessary in the process of the present invention just as it is in the usual process of pre-cooking the dough for French crullers, etc. and for the same reason. The mixture of the partial ingredients should next be cooled to a temperature at which the further ingredients to be added will not become cooked or partially so. Then add 3 pounds of eggs, preferably well beaten, and 1 pound of milk. Flavoring and other suitable elements may be added as desired. The whole is then thoroughly mixed and dried, as by spraying into a drying atmosphere, to produce a dry powder. It may be necessary to add water to facilitate spray drying.

The product is then ready for immediate use by merely mixing with water or milk to obtain a suitable consistency and baking or frying. The product is a stable prepared flour which may be effectively stored for use in homes and bakeries.

Various modifications in the details of procedure and in the particular composition may be made without departing from the spirit of the invention as defined in the claims.

I claim:

1. A method of producing a prepared flour adapted for use in making French crullers, cream puffs and éclairs which comprises boiling a major proportion of flour in water in the presence of a minor proportion of shortening until the flour is gelatinized, cooling to below cooking temperature, and then adding eggs and milk and dehydrating and comminuting the product to provide a dry, powdery flour wherein the ingredients are in approximately the proportions required for the pastry to be made from said product.

2. A method of producing a prepared flour adapted for use in making French crullers, éclairs and cream puffs which comprises cooking a major proportion of flour in water in the presence of a minor proportion of shortening until the flour is gelatinized, cooling to below cooking temperature and then adding eggs and milk and spray drying the product to provide a dry, powdery flour wherein the ingredients are approximately the proportions required for the pastry to be made therefrom.

3. A method of producing a prepared flour adapted for use in making French crullers, cream puffs and éclairs which comprises cooking a major proportion of flour in water in the presence of a minor proportion of shortening until the flour is gelatinized and spray drying the product to provide a dry, powdery flour.

4. A method of producing a prepared pastry flour adapted for use in making French crullers, cream puffs and éclairs which comprises cooking a major proportion of flour in water in the presence of a minor proportion of shortening until the flour is gelatinized and dehydrating and comminuting the product to provide a dry, powdery flour.

5. A prepared pastry flour for use in making French crullers, éclairs and cream puffs, prepared by the method of claim 4, comprising a fatty flour the particles of which consist essentially of gelatinized shortening-impregnated flour, the proportion of flour exceeding the proportion of shortening, said proportions being in the ratio required for the pastry to be made from the product and the product being in a stable finely-divided form.

6. A prepared pastry flour for use in making French crullers, éclairs and cream puffs, prepared by the method of claim 2, comprising a stable dried and finely divided mixture of eggs, milk and a fatty flour the particles of which consist essentially of gelatinized shortening-impregnated flour, the proportion of flour exceeding the proportion of shortening, the flour, shortening, eggs and milk being present in the proportions required for the pastry to be made from the mixture.

ABRAHAM KIPNIS.

REFERENCES CITED

The following references are of record in the file of this patent:

UNITED STATES PATENTS

| Number | Name | Date |
|---|---|---|
| 678,454 | Anstaett | July 16, 1901 |
| 1,039,912 | Dollings | Oct. 1, 1912 |
| 1,262,506 | Johnson | Apr. 9, 1918 |
| 1,431,938 | Dunham | Oct. 17, 1922 |
| 1,432,057 | Dunham | Oct. 17, 1922 |
| 1,944,881 | Finkel | Jan. 30, 1934 |
| 2,221,563 | Young | Nov. 12, 1940 |
| 2,228,729 | Pean | Jan. 14, 1941 |
| 2,401,259 | Lloyd | May 28, 1946 |
| 2,471,435 | Kimball | May 31, 1949 |

FOREIGN PATENTS

| Number | Country | Date |
|---|---|---|
| 4,370 | Great Britain | of 1902 |

OTHER REFERENCES

Lord: Everybody's Cook Book, 1924 ed., p. 607, Bk. 42.